United States Patent Office 3,135,714
Patented June 2, 1964

3,135,714
COPOLYMER OF A MONOVINYL ETHER OF A GLYCOL AND DIETHYL ESTER OF FUMARIC ACID AND VULCANIZATES THEREOF
George B. Sterling and Robert L. Zimmerman, Midland, Mich., assignors to The Dow Chemical Company, Midland, Mich., a corporation of Delaware
No Drawing. Filed Oct. 24, 1960, Ser. No. 64,245
9 Claims. (Cl. 260—41)

This invention relates to compositions of matter comprising rubbery copolymers and vulcanizates thereof. More particularly, this invention is concerned with copolymers of monovinyl ethers of glycols and dialkyl esters of alpha, beta-ethylenically unsaturated dicarboxylic acids and to vulcanized compositions thereof.

It is known that rubbery copolymers can be made by the copolymerization of various monomers such as styrene with butadiene, acrylonitrile with butadiene, and isobutylene with butene. As the search continues for monomers and combinations of monomers which will produce rubbery material when subjected to polymerization, it has been found that many monomers produce inflexible resinous products and that elastomeric materials are difficult to produce.

It is among the objects of the present invention to provide a new rubbery composition of matter. A further object of the present invention is the provision of a vulcanized product suitable for use in place of vulcanized natural rubber. Another object of the present invention is the provision of a novel reinforced elastomeric composition. A further object of the present invention is to produce elastomeric compositions which are free of residual unsaturation. These and other objects are attained in accordance with the practice of the present invention as will appear from the following description.

It has now been discovered, and the discovery forms the basis of the invention, that elastomeric compositions can be produced by reacting the monovinyl ether of a glycol with a dialkyl ester of an alpha,beta-ethylenically unsaturated dicarboxylic acid. The resulting rubbery copolymers can be compounded with reinforcing agents and cured to produce vulcanized rubbers of superior quality.

The monovinyl ethers suitable for the production of copolymers and vulcanizates of the present invention are the monovinyl ethers of glycols and are represented by the general formula $HO-(C_nH_{2n}O-)_xCH=CH_2$ in which $n$ is a positive integer from 2 to 4 and in which $x$ is a positive integer from 1 to 3. Representative examples of such compounds are the monovinyl ether of ethylene glycol, the monovinyl ether of trimethylene glycol, the monovinyl ether of propylene glycol, the monovinyl ethers of the butylene glycols, the monovinyl ether of diethylene glycol, the monovinyl ether of tripropylene glycol and the monovinyl ether of dibutylene glycol.

The monomers copolymerizable with the monovinyl ethers to prepare the elastomers of the present invention are dialkyl esters of alpha, beta-ethylenically unsaturated dicarboxylic acids. The double bond in the dicarboxylic acids from which are made the esters useable to form the polymers of the present invention, need be in the alpha,beta-position with respect to only one carboxyl group, but may be in such position as to both carboxyl groups. Such esters are represented by the structural formula $H-(C_nH_{2n})-Z-(C_mH_{2m})-H$ in which $m$ and $n$ are positive integers from 1 to 4 and Z is the bivalent radical obtainable by removing the hydroxyl hydrogens from an alpha,beta-ethylenically unsaturated dicarboxylic acid having from 4 to 10 carbon atoms. Representative specific examples of such copolymerizable monomers are the dimethyl ester of maleic acid, the ethyl propyl ester of maleic acid, the diethyl ester of fumaric acid, the dipropyl ester of citraconic acid, the dibutyl ester of itaconic acid, the methyl ethyl ester of phenymaleic acid, and the ethyl propyl ester of mesaconic acid.

Advantageously the copolymers of the present invention are produced by reacting the comonomeric materials in a confined zone in the presence of suitable catalysts such as free radical catalysts. The materials are preferably agitated slowly and maintained at elevated temperatures during the reaction.

It is found that rubbery polymers can be produced which contain in polymerized form between about 33 percent and about 67 percent by weight of the dialkyl ester and between about 67 percent and about 33 percent by weight of the monovinyl ether. Very good elastomeric materials are provided by polymers containing in the polymer molecule between about 40 percent and about 60 percent by weight of the dialkyl ester and between about 60 percent and about 40 percent by weight of the monovinyl ether.

The copolymers of the present invention can be vulcanized by compounding the copolymers with vulcanizing agents and subjecting the compounded materials to curing conditions. For example, the crude rubbery material can be compounded with vulcanizing agents such as sulfur, sulfur chloride and aniline butyroaldehyde. When the crude rubbery material is to be converted into vulcanized products, it is highly desirable that the crude material be compounded with a reinforcing filler since it is found that such fillers substantially increase the tensile strength and other physical properties of the vulcanizate. Representative examples of reinforcing fillers are the various carbon blacks including lamp black, channel black, furnace black and the like, zinc oxide and kaolin. It is desirable to employ an accelerator in the compounding as they substantially reduce the amount of time required to carry out the vulcanization. Representative examples of accelerators suitable for use in producing the vulcanizates of the present invention are benzothiazyldisulfide, mercaptobenzothiazole, diphenylguanidine, and zinc dimethyl dithiocarbamate. Advantageously, the crude rubber is also compounded with an activator to initiate the vulcanization reaction. Among the activators suitable for use to produce the vulcanized products of the present invention are zinc oxide, lead oxide, magnesium oxide and stearic acid.

The compounding of the crude rubber can be done by malaxing, kneading, milling or otherwise intimately blending the crude rubber of this invention with the compounding ingredients in the desired proportions as by compounding the materials with one another in an internal mixer such as a plastics extruder or a Banbury mixer or on an external mixer such as an open-faced roll mill to form a homogeneous composition.

The following examples are illustrative of the present invention but the invention is not limited to the specific details thereof. All parts and percentages are parts and percentages by weight unless otherwise specified.

*Example I*

There are placed in a 12-ounce citrate bottle 45 grams of the monovinyl ether of diethylene glycol, 55 grams of diethyl fumarate, 5 grams of lauroyl peroxide and 5 grams of alpha-alpha'-azobis(isobutyronitrile), the latter two materials acting as catalysts. The bottle is then flushed with nitrogen, capped and clamped into a tumbler-type washing machine. The machine is operated at 40 rotations per minute and kept at a temperature of 60° C. for 30 hours. The bottle is removed from the machine and broken to obtain the contents which is a gel of polymer and monomer. The polymer is devolatilized by heating for 10 hours at a temperature of 100° C. and at a pressure of 10 mm. of mercury. There is obtained 66.6 grams of crude rubbery copolymer containing in polymerized form 52.1 percent of diethyl fumarate and 47.9 percent of the monovinyl ether of diethylene glycol.

One hundred parts of the crude rubbery copolymer is fed onto a cold two-roll mill. There are then compounded with the polymer on the mill for 15 minutes 40 parts of furnace black, 5 parts of zinc oxide, 2 parts of sulfur and 3 parts of benzo-thiasyldisulfide, an accelerator. The homogeneous mixture is then placed in a mold and cured at a temperature of 145° C. for 50 minutes. The cured product when tested in the manner described in A.S.T.M. D-412-51T exhibits an elongation of 220 percent, a tensile strength of 716 pounds per square inch, a 100 percent modulus of 400 pounds per square inch, and a permanent set of 12.5 percent. When tested in accordance with A.S.T.M. D-676-55T the material is found to possess a Shore A hardness of 50 and a Shore C hardness of 19.

*Example II*

One hundred parts of the crude rubbery copolymer produced in accordance with the method described in Example I is compounded on a cold two-roll mill. The rubbery copolymer is placed on the mill first. There are then added 40 parts of furnace black, 4 parts of litharge, 1 part of stearic acid and 1 part of aniline butyroaldehyde. The milling is continued for about 15 minutes to obtain a homogeneous mixture of the constituent ingredients. The mixture is then cured in a mold for 50 minutes at a temperature of 145° C. This cured material, when tested according to the A.S.T.M. procedures referred to in Example I shows an elongation of 790 percent, a tensile strength of 2163.3 pounds per square inch, a permanent set of 15.6 percent, a 100 percent modulus of 130.4 pounds per square inch, a 300 percent modulus of 450.4 pounds per square inch, a Shore A hardness of 49, and a Shore C hardness of 15. As can be seen, this product is a very good rubber.

In a manner similar to the foregoing examples each of the monovinyl ethers within the class above defined and mixtures thereof are copolymerizable with each of the dialkyl esters within the class above defined and mixtures thereof to produce rubbery copolymers which can be compounded with reinforcing fillers and cured to produce vulcanizates having properties similar to those obtained by the procedures given above.

The new compositions possess good processability and can be compounded in accordance with the standard formulations and according to standard techniques. The compounding can include peptizers, plasticizers, softeners, retarders, antioxidants, extenders and coloring materials as well as various factices, natural, synthetic and reclaimed rubbers. The compositions are useful for making a variety of rubber articles including sheets, films, gaskets, electrical insulation and the like, by well known techniques such as molding, calendering, extruding and the like.

As will be appreciated, various modifications can be made within the scope of the present invention without departing from the spirit thereof.

That which is claimed is:

1. A composition of matter comprising a copolymer containing in polymerized form from about 40 percent to about 60 percent of a monovinyl ether represented by the general formula $HO-(C_nH_{2n}O-)_xCH=CH_2$ in which $n$ is a positive integer from 2 to 4 and in which $x$ is a positive integer from 1 to 3, and from about 40 percent to about 60 percent of a dialkyl ester represented by the general formula $H-(C_nH_{2n})-Z-(C_mH_{2m})-H$ in which $m$ and $n$ are positive integers from 1 to 4 and Z is the bivalent radical obtainable by removing the hydroxyl hydrogens from an alpha,beta-ethylenically unsaturated dicarboxylic acid.

2. A composition of matter according to claim 1 in which the monovinyl ether is the monovinyl ether of diethylene glycol.

3. A composition of matter according to claim 1 in which the dialkyl ester is a dialkyl ester of fumaric acid.

4. A composition of matter according to claim 1 in which the dialkyl ester is the diethyl ester of fumaric acid.

5. A composition of matter according to claim 4 in which the monovinyl ether is the monovinyl ether of diethylene glycol.

6. A vulcanized synthetic rubber made by compounding together a copolymer of the monovinyl ether of diethylene glycol and the diethyl ester of fumaric acid, there being present in the copolymer in polymerized form about 33 percent to about 67 percent of the monovinyl ether and about 67 percent to about 33 percent of the diethyl ester, rubber-vulcanizing agents, and a reinforcing filler, and heating the resulting composition at curing temperature until the composition is substantially vulcanized.

7. A vulcanized synthetic rubber according to claim 6 in which the reinforcing filler comprises carbon black.

8. A vulcanized synthetic rubber according to claim 6 in which the reinforcing filler comprises zinc oxide.

9. A vulcanized synthetic rubber made by compounding together a copolymer of the monovinyl ether of diethylene glycol and the diethyl ester of fumaric acid, there being present in the copolymer in polymerized form about 40 percent to about 60 percent of the monovinyl ether and about 60 percent to about 40 percent of the diethyl ester, rubber-vulcanizing agents, and carbon black, and heating the resulting composition at curing temperature until the composition is substantially vulcanized.

References Cited in the file of this patent

UNITED STATES PATENTS

| | | |
|---|---|---|
| 2,016,490 | Fikentscher | Oct. 8, 1935 |
| 2,492,169 | Mast et al. | Dec. 27, 1949 |
| 2,692,256 | Bauer | Oct. 19, 1954 |
| 2,828,220 | McWherter et al. | Mar. 25, 1958 |

FOREIGN PATENTS

| | | |
|---|---|---|
| 378,544 | Great Britain | Aug. 18, 1932 |
| 441,064 | Great Britain | Jan. 9, 1936 |